United States Patent [19]

Rockerath et al.

[11] E Re. 29,758

[45] Reissued Sep. 12, 1978

[54] REINFORCED HEM FORMING DEVICE

[75] Inventors: John L. Rockerath; Harold J. Schreck, both of Utica, N.Y.

[73] Assignee: Cluett, Peabody & Co., Inc., Troy, N.Y.

[21] Appl. No.: 835,233

[22] Filed: Sep. 21, 1977

Related U.S. Patent Documents

Reissue of:

[64] Patent No.: 3,906,877
Issued: Sep. 23, 1975
Appl. No.: 515,492
Filed: Oct. 17, 1974

[51] Int. Cl.[2] ..... D05B 35/02
[52] U.S. Cl. ..... 112/141
[58] Field of Search ..... 112/141, 147, 152, 153

[56] References Cited

U.S. PATENT DOCUMENTS

| | | | |
|---|---|---|---|
| 1,222,069 | 4/1917 | Chalman | 112/147 |
| 1,741,866 | 12/1929 | Mann | 112/152 X |
| 1,823,954 | 9/1931 | Sailer | 112/141 |
| 1,864,503 | 6/1932 | Maier | 112/152 X |
| 1,906,104 | 4/1933 | Sailer | 112/153 X |
| 1,916,058 | 6/1933 | Maier | 112/141 |
| 2,138,633 | 11/1938 | Greenfield et al. | 112/141 |
| 2,518,340 | 8/1950 | Levine et al. | 112/141 |
| 3,595,187 | 7/1971 | Gray | 112/141 |
| 3,631,826 | 1/1972 | Morgan | 112/141 |

*Primary Examiner*—Alfred R. Guest
*Attorney, Agent, or Firm*—Prutzman, Hayes, Kalb & Chilton

[57] ABSTRACT

A sewing machine installation with a reinforced hem forming device for automatically forming a hem, reinforced by an integrated reinforcing strip, along an edge of a material blank as the blank is conveyed forwardly through the forming device to a stitching station.

12 Claims, 7 Drawing Figures

REINFORCED HEM FORMING DEVICE

Matter enclosed in heavy brackets [ ] appears in the original patent but forms no part of this reissue specification; matter printed in italics indicates the additions made by reissue.

BRIEF SUMMARY OF THE INVENTION

The present invention relates generally to hem forming devices for automatically forming a hem on a material blank as it is conveyed forwardly through the hem forming device to a stitching station of a sewing machine and more particularly to a new and improved hem forming device for automatically forming a reinforced hem having an integrated reinforcing strip.

It is a principal aim of the present invention to provide a new and improved hem forming device useful in a sewing machine installation for automatically forming a hem, reinforced with an integrated reinforcing strip, along an edge of a material blank as the material blank is conveyed forwardly through the material forming device to a stitching station of the sewing machine installation.

It is another aim of the present invention to provide a new and improved reinforced hem forming device for automatically forming a reinforced button stay hem, for example on a shirt front blank, as the material blank is conveyed forwardly through the hem forming device.

It is a further aim of the present invention to provide a reinforced hem forming device of the type described for automatically forming an improved reinforced hem along the edge of a material blank by a single pass of the material blank through the forming device.

It is another aim of the present invention to provide a new and improved reinforced hem forming device of the type described useful in a sewing machine installation for forming a reinforced hem along the edge of material blanks as they are conveyed in succession at a relatively high rate of speed through the forming device to a stitching station of the sewing machine installation.

It is a further aim of the present invention to provide a new and improved reinforced hem forming device of the type described which is adjustable to accurately set the hem dimensions.

It is another aim of the present invention to provide a new and improved reinforced hem forming device of the type described providing reliable operation over a long service free useful life.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1:
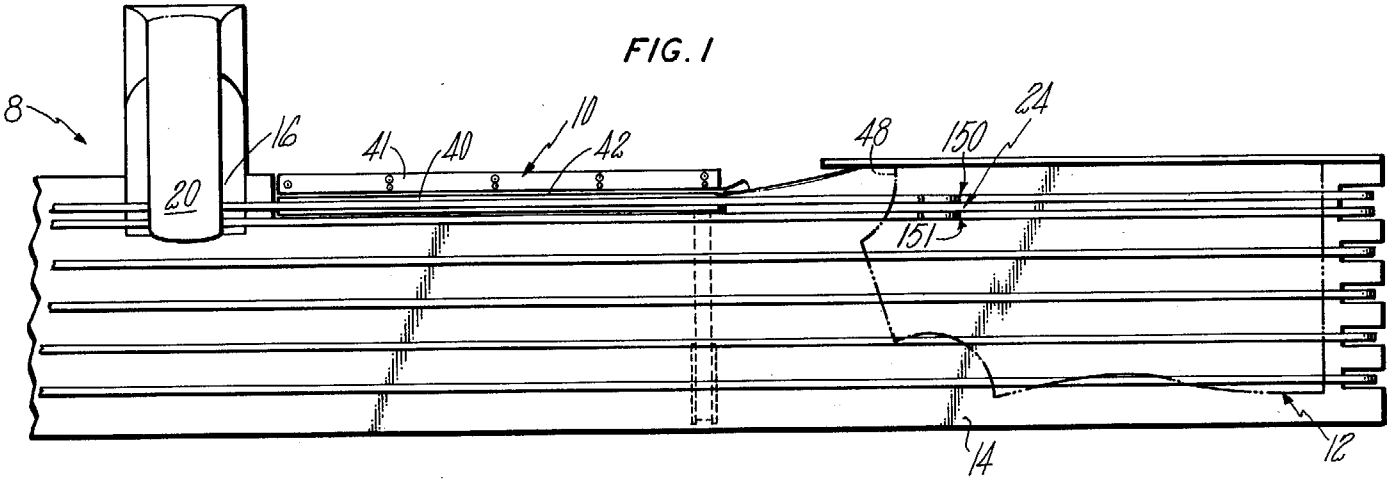
FIG. 1 is a partial top plan view, partly broken away, of a sewing machine installation incorporating an embodiment of a reinforced hem forming device of the present invention.

Referring now to the drawings in detail wherein like numerals represent like parts throughout the several figures, a sewing machine installation 8 is shown incorporating an embodiment of a reinforced hem forming device 10 of the present invention for automatically forming a reinforced button stay hem 11 on a precut shirt front blank 12 as the material blank 12 is fed longitudinally forwardly from right to left as viewed in FIG. 1, along a material support table 14 through the forming device 10 to a stitching station 16. The reinforced button stay hem 11 formed by the forming device 10 is stitched at the stitching station 16 by a single line of stitching 19 along the inner edge of the hem 11 by a stitching needle 18 of a sewing machine head 20.

The sewing machine installation 8 employs a suitable belt conveyor system 24 for conveying the shirt front blanks 12 longitudinally forwardly along the support table 14 through the forming device 10 and stitching station 16. The sewing machine installation 8 apart from the forming device 10 does not form any part of the present invention and may be constructed for example as shown and described in our co-pending U.S. patent application Ser. No. 427,904 filed Dec. 26, 1973 and entitled "Sewing Machine Material Feed Mechanism".

Figure 3:
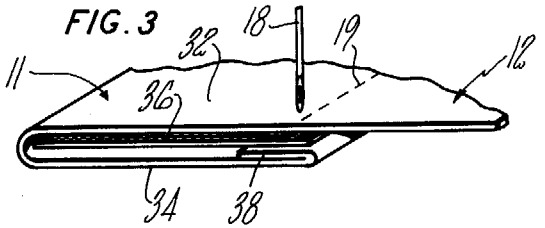
FIG. 3 is an enlarged end view, partly broken away, showing a material blank with a reinforced hem formed by the forming device.
Figure 4:
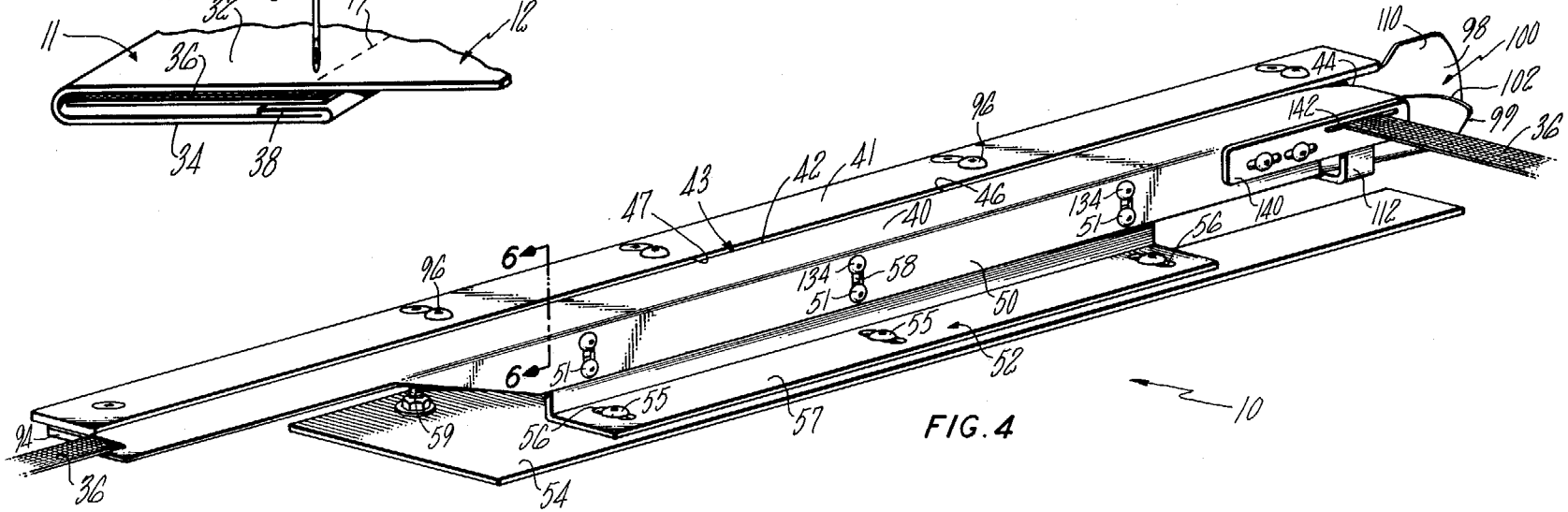
FIG. 4 is an enlarged isometric view of the forming device.
Figure 2:
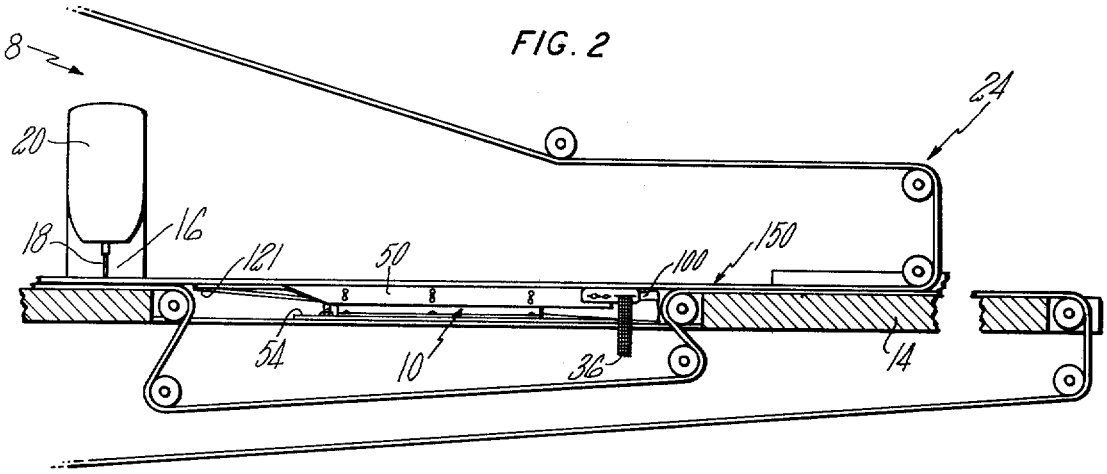
FIG. 2 is a partial elevation view, partly broken away and partly in section, of the sewing machine installation.
Figure 6:
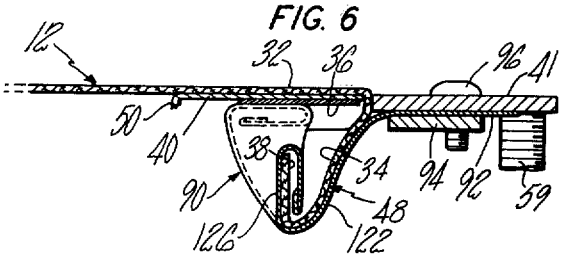
FIG. 6 is an enlarged partial elevation section view of the forming device taken substantially along line 6—6 of FIG. 4.
Figure 7:
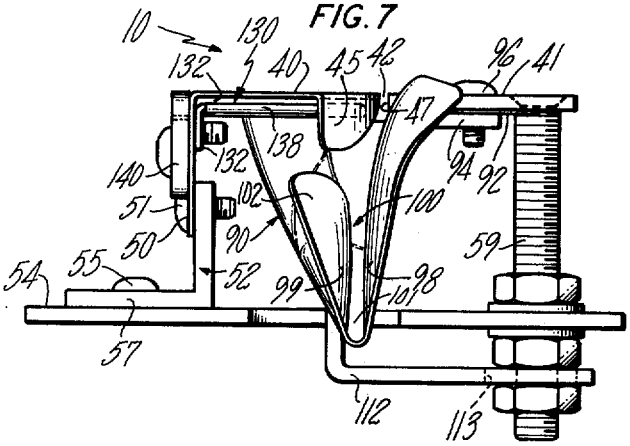
FIG. 7 is an enlarged rear elevation view of the forming device.
Figure 5:
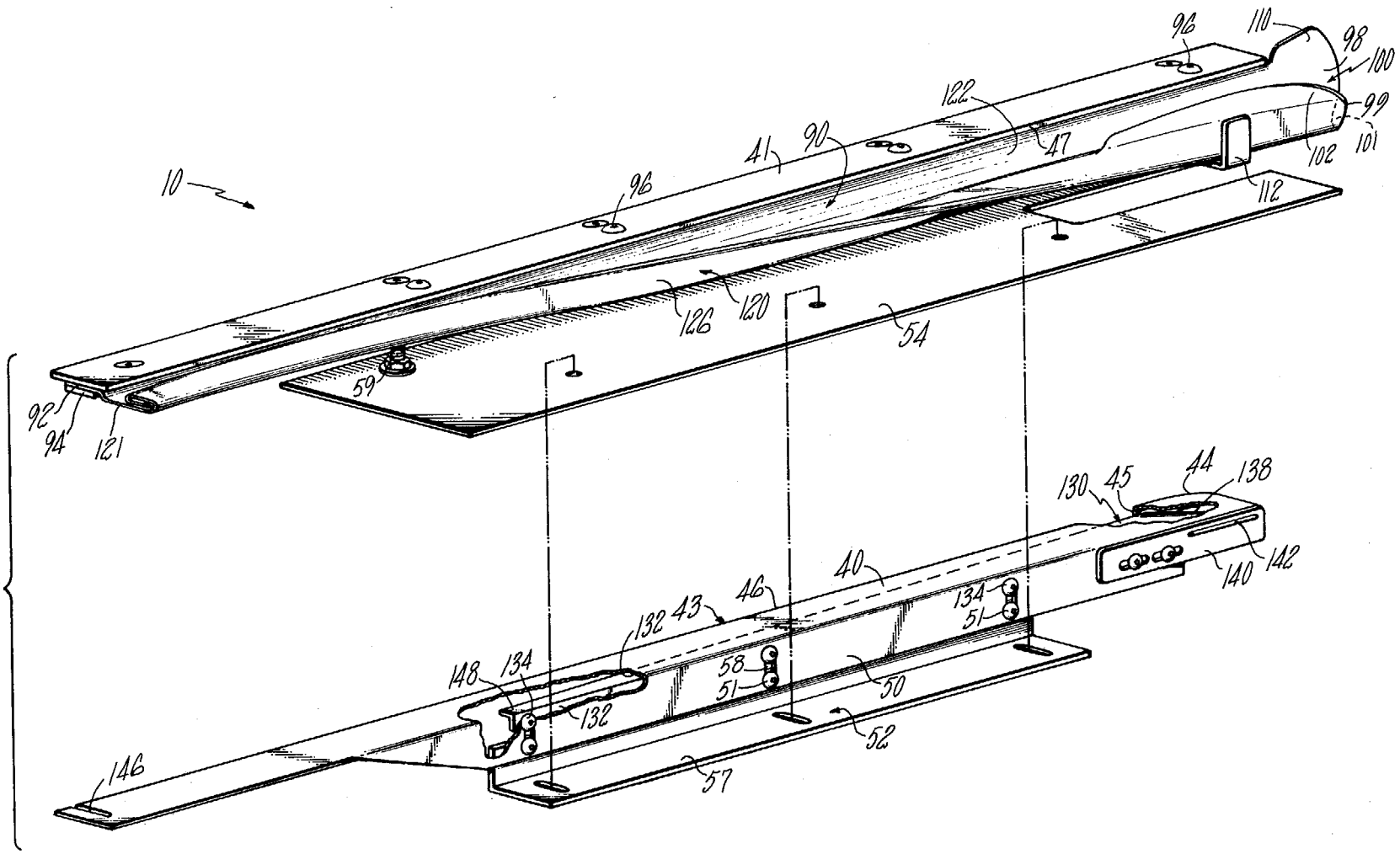
FIG. 5 is an enlarged partly exploded isometric view, partly broken away and partly in section, of the forming device.

Referring to FIG. 3, the forming device 10 provides for forming a reinforced button stay hem 11 having an overlying or front hem face 32, an underlying or back hem face 34, a reinforcing or filler strip or ribbon 36 intermediate the hem faces 32, 34 preferably extending substantially the entire length of the hem 11 and a folded or tucked edge 38 at the inner edge of the back face 34 and underlying the reinforcing ribbon 36. The reinforced hem 11 is therefore formed to have a clean outer appearance with the edge 38 of the garment material blank 12 tucked between the reinforcing ribbon 36 and back hem face 34 and whereby the edge 38 is hidden under the ribbon 36 and secured with the ribbon 36 by the single line of stitching 19.

The forming device 10 comprises inner and outer longitudinally extending narrow face plates 40, 41 forming a part of the material support table 14 and having upper flat support faces which are preferably coplanar with the remainder of the material support table 14. The inner and outer face plates 40, 41 are laterally spaced to provide a narrow material receiving slot 42 therebetween. The inner face plate 40 is made of relatively thin gauge sheet material and has an outer lateral edge 43 with a convex or rounded entry edge section 44 and a remaining straight edge section 46 extending longitudinally parallel to a straight inner edge 47 of the outer face plate 41 and parallel to the longitudinal path of travel of the garment blanks 12 as they are fed forwardly along the support table 14 by the belt conveyor system 24. A depending entry guide flange 45 is provided along the rounded entry edge section 44 of the inner face plate 40 for assisting in guiding a depending outer edge section 48 of each precut blank 12 into the slot 42 of the forming device 10 as the precut blank 12 is fed forwardly along the table 14.

A depending mounting flange 50 is provided along the inner edge of the inner face plate 40 for mounting the face plate 40 via an L-shaped mounting bracket 52 to a baseplate 54 of the hem forming device. The L-shaped mounting bracket 52 is secured to the base plate 54 by screws 55 extending through laterally extending slots 56 in the base 57 of the bracket 52. The bracket 52 is thereby made laterally adjustable on the base plate 54 for adjusting the inner face plate 40 relative to the path of travel of the blank 12 and for thereby adjusting the width of the outer edge section 48 and the effective width of the hem 11 and/or lateral position of the line of stitching 19 on the hem. The inner face plate 40 is secured to the bracket 52 by screws 51 extending through vertically extending slots 58 in its mounting flange 50 and threaded into the bracket 52 and whereby the inner face plate 40 is made vertically adjustable on the mounting bracket 52 to position the upper face of the inner face plate 40 in the plane of the support table 14.

The outer face plate 41 is rigidly secured to the base plate 54 by means of threaded mounting pillars 59, and whereby the threaded pillars 59 are adjustable to position the upper face of the outer face plate 41 in the plane of the support table 14.

A longitudinally extending relatively thin gauge sheet metal guide or folder 90 is mounted generally below the material receiving slot 42 and inner face plate 40 for receiving and folding the outer edge section 48 of a material blank as the material blank is fed forwardly through the material forming device 10. The folder 90 has an upper laterally outwardly extending mounting flange 92 secured to the underside of the outer face plate 41 by an elongated retaining plate 94 and fasteners 96 extending through the face plate 41 and flange 92 and threaded into the retaining plate 94. The folder 90 has a generally depending guide with a pair of opposed longitudinally extending sidewalls 98, 99 forming a guide trough 100 and has a depending entry end 101 with a generally U-shaped configuration for receiving the outer edge section 48 of a material blank. The outer sidewall 98 is substantially wider than the opposed inner side wall 99, and the narrow inner sidewall 99 extends generaly prallel to and is transversly spaced from the outer sidewall 98 to form the material receiving guide trough 100. As hereinafter more fully described the guide trough 100 provides for guiding the outer edge section 48 of a garment blank 12 into the desired folded condition as the blank 12 is longitudinally forwardly conveyed through the forming device 10.

The entry end 101 of the folder 90 is located slightly rearwardly of the rear ends of the face plates 40, 41. The entry end of the narrow inner sidewall 99 has an upstanding entry guide lip 102 and is flared inwardly to assist in guiding the depending outer edge section 48 of a garment blank 12 into the material guide through 100. Similarly, the entry end of the wider outer sidewall 98 is formed with an upstanding lip 110 and is flared outwardly for assisting in guiding the material into the guide trough 100. An L-shaped entry locating bracket 112 having a laterally extending mounting slot 113 is mounted on the lower end of the rear threaded pillar 59 and is laterally adjustable for adjusting the lateral position of the entry end 101 of the folder 90, the entry end 101 of the folder 90 being laterally resilient and being naturally biased laterally inwardly by a longitudinally extending double twist 120 in the folder.

The longitudinally extending double twist 120 extends longitudinally forwardly gradually from substantially the rear entry end 101 of the folder 90 to its foward or exit end 121. The double twist 120 comprises a first longitudinally extending twist section 122 twisting longitudinally forwardly substantially 90° in the clockwise direction to fold a back face 34 portion of a hem into a position generally parallel to and spaced below an overlying front face portion 32 conveyed along the upper face of the inner face plate 40. The double twist 120 comprises a second longitudinally extending twist section 126 along just the bottom of the trough, and also twisting longitudinally forwardly in the clockwise angular direction. The second longitudinally extending twist section 126 is formed essentially by twisting together the inner narrow sidewall 99 and the adjacent lower portion of the wide outer sidewall 98 approximately 180° from planes generally parallel to the plane of the remainder of the sidewall 98. The second twist section 126 thereby provides for folding the edge portion of a material blank 12 upwardly and outwardly to tuck the edge between the front and back hem faces 32, 34 respectively. Accordingly, each material blank 12 emerges from the folder 90 with the hem completely prefolded for the subsequent stitching operation by the sewing machine head.

An elongated relatively thin gauge sheet metal guide plate 130 is mounted directly below the inner face plate 40 to define a longitudinally extending channel 132 therebetween for guiding a ribbon 36 longitudinally forwardly beneath the inner face plate 40 and immediately below the front hem face 32 and above the back hem face 34 as it is formed by the folder 90. An integral depending mounting flange 132 provided along the inner edge of the ribbon guide plate 130 provides for securing the guide plate 130 to the inner depending mounting flange 50 on the inner face plate 40. Mounting fasteners 134 extending through the vertical slots 58 in the flange 50 are threaded into the guide plate mounting flange 132 and so that guide plate 130 is vertically adjustable to control the height of the ribbon channel 132 for feeding the ribbon 36 immediately beneath the inner face plate 40.

The entry end of the guide plate 130 has an inclined rounded leading edge 138 extending laterally outwardly and longitudinally forwardly substantially 45° to the path of travel of the material blanks 12. The ribbon 36 is fed from a suitable spool transversely under the entry end of the guide plate 130, then over the rounded inclined leading edge 138 and longitudinally forwardly along the channel 132. The leading edge 138 may be suitably secured to the depending guide flange 45 to assist in rigidly holding the guide plate 130 in place.

A ribbon guide plate 140 having a longitudinally extending ribbon receiving slot 142 is mounted on the mounting flange 50 on the inner face plate 40 and is longitudinally adjustable for adjusting the longitudinal entry position of the ribbon 36 and for thereby adjusting the lateral position of the ribbon 36 as it is fed over the leading edge 138 into the channel 132. Also, the inner face plate 40 has a ribbon exit slot 146 slightly rearwardly of the exit end of the folder 90. The ribbon exit slot 146 extends laterally inwardly from its outer edge 46 and has a length approximately equal to but slightly greater than the width of the ribbon 36. The ribbon 36 is thereby properly laterally positioned by the slot 146 as it emerges from underneath the inner face plate 40 into contiguous underlying association with the front face 32 of the hem.

Immediately forwardly of the ribbon exit slot 146, the underlying face 34 and tucked edge 38 of the hem are fed into contiguous association with the front overlying face 32 of the hem and the intermediate reinforcing ribbon 36. Thus, the material blank hem is fully preformed and the ribbon 36 is integrated within the hem and whereby the formed material blank is adopted to be conveyed by the belt conveyor 23 to be stitched at the stitching station by a single line of stitching 19.

The guide plate 130 is tapered longitudinally forwardly and laterally inwardly from its rounded leading edge 138 to its forward or exit end 148. Also, the forward end 148 of the guide plate 130 terminates substantially rearwardly of the forward end 121 of the folder 90 to permit the exit end of the folder 90 to lie immediately below the inner face plate 40 with the ribbon 36 passing therebetween.

The material blank 12 is automatically conveyed along the forming device by the belt conveyor system 24, and the strengthening ribbon 36 is held in position within the preformed hem by the belt conveyor system 24 through the engagement of pairs 150, 151 of belts engaging the outer and inner faces of the hem and body of each material blank 12 as the prefolded hem emerges from the forming device 10. Thus, though the ribbon 36 is not directly engaged by the conveyor belts, it is conveyed forwardly with each material blank 12 to permit the blank 12 and ribbon 36 to be formed and stitched together as described.

As will be apparent to persons skilled in the art, various modifications, adaptations and variations of the foregoing specific disclosure can be made without departing from the teachings of the present invention.

We claim:

1. A reinforced hem forming device for use in a sewing machine installation for automatically forming a reinforced hem, along a lateral edge of a material blank as the blank is conveyed longitudinally forwardly through the forming device, having a front hem face, an elongated reinforcing ribbon underlying the front face, and an outer lateral inwardly folded edge section having a back hem face underlying the reinforcing ribbon and a tucked edge portion intermediate the front and back hem faces, the reinforced hem forming device comprising a longitudinally extending inner face member having an upper inner face for receiving a front hem face portion of a material blank as the material blank is conveyed longitudinally forwardly through the forming device and an outer longitudinally extending fold edge for folding an outer lateral edge section of the material blank inwardly therearound to underlie the front hem face portion of the material blank to form a back hem face portion, a longitudinally extending ribbon guide underlying the inner face member providing a longitudinally extending ribbon channel therebelow for conveying a reinforcing ribbon longitudinally forwardly beneath the front hem face portion of the material blank, and a folder extending longitudinally forwardly generally below the inner face member and ribbon guide and defining a material receiving guide trough for receiving the outer lateral edge section of the material blank, the folder having a double longitudinally extending twist with a first longitudinally extending twist section twisting forwardly in a clockwise direction to define a first longitudinally extending guide trough section for folding the outer lateral edge section of the material blank inwardly around said fold edge of the inner face member and a second longitudinally extending twist section twisting in the clockwise direction to define a second longitudinally extending guide trough section for folding a tucked edge portion of the outer lateral edge section of the material blank to overly the back hem face portion of the material blank, the folder having a forward exit end adjacent the inner face member to provide that a hem formed on a material blank by the hem forming device exits from the forming device in a fully preformed condition with the reinforcing ribbon between the front and back hem faces thereof.

2. A reinforced hem forming device according to claim 1 further comprising a support base below the inner face member and folder and mounting means for independently mounting the inner face member and folder on the support base and for lateral adjustment of the inner face member relative to the support base.

3. A reinforced hem forming device according to claim 2 wherein the mounting means also provides for vertically adjusting the inner face member relative to the support base.

4. A reinforced hem forming device according to claim 1 further comprising a longitudinally extending outer member laterally outwardly of the inner face member and having an inner longitudinally extending edge spaced laterally outwardly of the fold edge of the inner face member to define a material receiving slot therebetween.

5. A reinforced hem forming device according to claim 4 wherein the folder is constructed of sheet metal and has an upper outwardly extending mounting flange and further comprising means for securing the folder mounting flange to the underside of the outer member to extend longitudinally forwardly generally below the inner face member and ribbon guide.

6. A reinforced hem forming device according to claim 1 wherein the inner face member has a laterally extending ribbon exit slot at the forward longitudinal end thereof for feeding the reinforcing ribbon upwardly from the ribbon channel into underlying engagement with the front hem face portion of the material blank.

7. A reinforced hem forming device for use in a sewing machine installation for automatically forming a reinforced hem, along a lateral edge of a material blank as the blank is conveyed longitudinally forwardly through the forming device, having a front hem face, an elongated reinforcing ribbon underlying the front hem face, an outer lateral inwardly folded edge section having a back hem face underlying the reinforcing ribbon and a tucked edge portion intermediate the ribbon and back hem face, the reinforced hem forming device comprising a longitudinally extending inner face plate having an upper face for receiving a front hem face portion of a material blank as the material blank is conveyed longitudinally forwardly through the forming device and an outer longitudinally extending edge with a longitudinally extending straight fold edge section for folding an outer lateral edge section of the material blank inwardly therearound to underlie the front hem face portion of the material blank to form a back hem face portion, a longitudinally extending ribbon guide plate underlying and spaced below the inner face plate to define a longitudinally extending ribbon channel therebetween for conveying a reinforcing ribbon longitudinally forwardly beneath the front hem face portion of the material blank, [approximately 45° to the longitudinal path of the material blank for feeding the ribbon from transversely thereof under the ribbon guide plate, over the inclined leading edge and then longitudinally forwardly along the ribbon channel,] and a sheet metal folder extending longitudinally forwardly generally below the inner face plate and ribbon guide plate having a pair of spaced side walls defining a material receiving guide trough therebetween, the folder having a depending generally U-shaped rear entry generally aligned with the straight edge section of the inner face plate and with the spaced sidewalls respectively flaring laterally outwardly and laterally inwardly for assisting in guiding the outer lateral edge section of the material blank into the guide trough as the material blank is conveyed longitudinally forwardly through the forming device, the spaced folder sidewalls having a double longitudinally extending twist with a first longitudinally extending twist section twisting in the clockwise direction to define a first longitudinally extending guide trough section for folding the outer lateral edge section of the material blank inwardly around the straight edge section of the inner face plate and a second longitudinally extending twist section twisting in the clockwise direction to define a second longitudinally extending guide trough section for folding a tucked edge portion of the outer lateral edge section of the material blank upwardly and outwardly to overly the back hem face, the ribbon guide plate having a forward end rearwardly of the forward end of the inner face plate and the folder having a forward exit end adjacent the inner face plate to provide that a reinforced hem formed on a material blank by the hem forming device exits from the forming device in a fully preformed condition with the reinforcing ribbon between the front and back hem faces thereof.

8. A reinforced hem forming device according to claim 7 wherein the ribbon guide plate has a longitudinally rear entry edge inclined approximately 45° to the longitudinal path of the material blank for feeding the ribbon from transversely thereof under the ribbon guide plate, over the inclined leading edge and then longitudinally forwardly along the ribbon channel.

*9. A reinforced hem forming device for use in a sewing machine installation for automatically forming a reinforced hem along a lateral edge of a material blank as the blank is conveyed longitudinally forwardly through the forming device, the reinforced hem comprising a front hem face, an elongated reinforcing ribbon underlying the front face, and an outer laterally inwardly folded edge section having a back hem face underlying the reinforcing ribbon, the reinforced hem forming device comprising a longitudinally extending inner face member having an upper inner face for receiving a front hem face portion of a material blank as the material blank is conveyed longitudinally forwardly through the forming device and an outer longitudinally extending fold edge for folding an outer lateral edge section of the material blank downwardly and inwardly therearound to underlie the front hem face portion of the material blank to form a back hem face portion, a longitudinally extending ribbon guide underlying the inner face member providing a longitudinally extending ribbon channel therebelow for conveying a reinforcing ribbon longitudinally forwardly beneath the front hem face portion of the material blank, and fold means extending longitudinally forwardly generally below the inner face member and ribbon guide for folding the outer lateral edge section of the material blank inwardly around said fold edge of the inner face member as the material blank is conveyed longitudinally forwardly through the forming device, the fold means having a forward exit end adjacent the inner face member for feeding a reinforced hem formed on a material blank by the hem forming device forwardly therefrom in a fully preformed condition with the reinforcing ribbon between the front and back hem faces thereof.*

*10. A reinforced hem forming device for use in a sewing machine installation for automatically forming a reinforced hem along a lateral edge of a material blank as the blank is conveyed longitudinally forwardly along a generally horizontal path with a lateral edge portion of the blank conveyed longitudinally forwardly through the forming device; the reinforced hem comprising a front hem face, an elongated reinforcing ribbon underlying the front face, a back hem face underlying the reinforcing ribbon and a tucked edge portion intermediate the reinforcing ribbon and back hem face; the reinforced hem forming device comprising a longitudinally extending inner face member having an upper generally horizontal planar face for receiving a front hem face portion of a material blank as the material blank is conveyed longitudinally forwardly through the forming device and an outer longitudinally extending fold edge for folding an outer lateral edge section of the material blank downwardly and inwardly therearound to underlie the front hem face portion of the material blank, a longitudinally extending ribbon guide underlying the inner face member providing a longtudinally extending ribbon channel therebelow for conveying a reinforcing ribbon longitudinally forwardly beneath the front hem face portion of the material blank, and fold means extending longitudinally forwardly generally below the inner face member and ribbon guide for folding the outer lateral edge section of the material blank inwardly around said fold edge of the inner face member to form a back hem face portion thereof underlying said reinforcing ribbon and for folding a tucked edge portion of the outer lateral edge section upwardly and outwardly between the back hem face portion and the reinforcing ribbon, the fold means having a forward exit end adjacent the inner face member for longitudinally feeding a reinforced hem formed by the hem forming device forwardly therefrom in a fully preformed condition with the reinforcing ribbon between the front hem face and tucked edge portions thereof.*

*11. A reinforced hem forming device for use in a sewing machine installation for automatically forming a reinforced hem along a lateral edge of a material blank as the blank is conveyed longitudinally forwardly along a generally horizontal path with a lateral edge portion of the blank conveyed longitudinally forwardly through the forming device; the reinforced hem comprising a front hem face, an elongated reinforcing ribbon underlying the front hem face, and an outer lateral inwardly folded edge section having a back hem face underlying the reinforcing ribbon; the reinforced hem forming device comprising a longitudinally extending inner face member having an upper generally horizontal planar face for receiving a front hem face portion of a material blank as the material blank is conveyed longitudinally forwardly through the forming device and an outer longitudinally extending fold edge for folding an outer lateral edge section of the material blank downwardly and inwardly therearound to underlie the front hem face portion of the material blank, a longitudinally extending ribbon guide underlying the inner face member*

*providing a longitudinally extending ribbon channel therebelow for conveying a reinforcing ribbon longitudinally forwardly beneath the front hem face portion of the material blank, and fold means extending longitudinally forwardly generally below the inner face member and ribbon guide for folding the outer lateral edge section of the material blank inwardly around said fold edge of the inner face member to form a back hem face portion thereof underlying said reinforcing ribbon as the lateral edge portion of the material blank is conveyed longitudinally forwardly through the forming device.*

*12. A reinforced hem forming device according to claim 11 wherein the fold means defines a material receiving guide trough for receiving the outer lateral edge section of the material blank, the fold means having a longitudinally extending twist section twisting forwardly in a clockwise direction to define a longitudinally extending guide trough section for folding the outer lateral edge section of the material blank inwardly around said fold edge of the inner face member.*

* * * * *